United States Patent [19]

van Engelen et al.

[11] 4,251,584
[45] Feb. 17, 1981

[54] FOAMED POLYOLEFIN FILM OR SHEET PRODUCT

[75] Inventors: Gerardus van Engelen, Weert; Tom van Utteren, Maarheeze; Hubertus Vonken, Weert, all of Netherlands

[73] Assignee: Hoechst Aktiengesellschaft, Frankfurt am Main, Fed. Rep. of Germany

[21] Appl. No.: 954,761

[22] Filed: Oct. 26, 1978

[30] Foreign Application Priority Data

Oct. 31, 1977 [GB] United Kingdom ............... 45175/77

[51] Int. Cl.³ ............................................... B32B 3/30
[52] U.S. Cl. .................................... 428/159; 428/207; 428/220; 428/343; 521/81; 521/89; 521/92; 521/134; 521/149; 525/221; 525/222; 525/227; 525/239
[58] Field of Search ................. 521/134, 81; 428/220, 428/159

[56] References Cited

U.S. PATENT DOCUMENTS

| | | | |
|---|---|---|---|
| 3,810,964 | 5/1974 | Ehrenfreund | 521/134 |
| 4,091,136 | 5/1978 | O'Brien et al. | 521/134 |
| 4,102,829 | 7/1978 | Watanabe et al. | 521/81 |
| 4,110,269 | 8/1978 | Ehrenfreund | 521/908 |

FOREIGN PATENT DOCUMENTS

| | | | |
|---|---|---|---|
| 1236373 | 6/1971 | United Kingdom | 521/134 |
| 1280730 | 7/1972 | United Kingdom | 521/134 |
| 1331041 | 9/1973 | United Kingdom | 521/134 |
| 1408741 | 10/1975 | United Kingdom | 521/134 |
| 1463671 | 2/1977 | United Kingdom | 521/134 |

*Primary Examiner*—Morton Foelak
*Attorney, Agent, or Firm*—Schwartz, Jeffery, Schwaab, Mack, Blumenthal & Koch

[57] ABSTRACT

Disclosed is a film or sheet product comprising a closed cell foam comprised of a mixture of low density polyethylene and at least one ethylene polymer containing polar groups, and, optionally, a crystalline olefin polymer in which the mixture contains from about 0.025 to 1 percent by weight of said polar groups. Also disclosed is a method of making this film or sheet product and a wall covering material based thereon.

22 Claims, No Drawings

FOAMED POLYOLEFIN FILM OR SHEET PRODUCT

BACKGROUND OF THE INVENTION

The present invention relates to a closed cell foamed polyolefin film or sheet product and in particular to such products suitable for use in the production of wall coverings, which term also includes ceiling coverings.

When intended for use as a wall covering base film, it is desirable that such films have a low bulk density, so that they are light and easy to handle. Such films must also be readily printable and have a uniform smooth surface finish. These films should also be abrasion resistant.

It has been proposed, in British Patent Specification No. 1,220,053, to make wall coverings using an open cell foamed film formed from low density polyethylene. To overcome certain disadvantages, notably abrasion resistance, of such wall coverings, it has been proposed in British Patent Specification No. 1,306,373 to employ a mixture of high density and low density polyethylene in specified proportions.

When using a mixture of high and low density polyethylene, the extrusion temperature required to obtain satisfactory extrusion in higher than that required with low density polyethylene alone, because of the higher melting point of high density polyethylene. When using volatile liquid or gaseous blowing agents, such higher temperatures result in the production of open cell foams, and also a relatively large amount of blowing agent is required to obtain a foam of low bulk density.

Open cell foams generally have a relatively poor surface finish compared to closed cell foams. However, it has not been found possible to make closed cell foam films using volatile liquid or gaseous blowing agents from polyolefin mixtures containing more than 10% by weight of high density polyethylene.

It has been proposed, in British Patent Specification No. 1,376,151, to make an open cell foam material from a mixture of low density polyethylene and an ethylene copolymer containing polar groups. Comparative examples in that specification describe closed cell foams made from such mixtures, but no utility therefore is indicated.

SUMMARY OF THE INVENTION

It is therefore an object of the invention to provide an improved foamed film or sheet product.

Another object of the invention resides in providing an improved closed cell foamed polyolefin film or sheet product, which is particularly suitable for use as a wall covering base film.

It is also an object of the invention to provide an improved wall covering product based upon said closed cell foamed polyolefin film or sheet product.

A further object of the invention resides in providing a process for producing the improved closed cell foamed polyolefin film or sheet product.

In accomplishing the foregoing objects, there has been provided in accordance with the present invention a film or sheet product, comprising a closed cell foam comprised of a mixture of low density polyethylene and at least one ethylene polymer containing polar groups, and optionally, a crystalline olefin polymer in which the mixture contains from about 0.025 to 1 percent by weight, preferably from about 0.1 to 0.7 percent by weight of said polar groups. Preferably, the mixture contains from about 0.1 to 15 percent by weight of an ethylene polymer containing polar groups which is comprised of a copolymer of ethylene and one or more polar group containing comonomers, most preferably, an ethylene/vinyl acetate copolymer.

In accordance with another aspect of the present invention, there is provided a wall or ceiling covering comprising the foamed film or sheet product as defined above. Preferably, one surface of the film or sheet product is embossed, and one surface thereof bears an adhesive. In another embodiment, a printed pattern is applied to one surface.

In still another aspect of the present invention, there is provided a process of manufacturing a closed cell foamed film or sheet product as defined above, comprising the steps of plastifying the polymer mixture, injecting a blowing agent into the plastified polymer mixture to form a homogeneous mixture and thereafter extruding the homogeneous mixture.

Further objects, features and advantages of the present invention will become apparent from the detailed description of preferred embodiments which follows.

DETAILED DESCRIPTION OF PREFERRED EMBODIMENTS

It has now been found that closed cell foams made from polymer mixtures containing a smaller proportion of polar groups than are described in British Specification No. 1,376,151 are of particular utility in the manufacture of wall coverings.

Accordingly there is provided according to the present invention a closed cell foamed film formed from a mixture of low density polyethylene, and at least one ethylene polymer containing polar groups, and optionally, a crystalline olefin polymer, in which the mixture contains from about 0.025 to 1% by weight of said polar groups.

By the term low density polyethylene is meant homopolymers of ethylene, and copolymers of ethylene with less than 20% by weight of other olefins, having a density of less than 0.934 g/cm$^3$. Homopolymers of ethylene are preferred.

By the term polar groups is meant atoms or non hydrocarbon groups pendant to the polymer chain. Examples of such groups include ester groups, and carboxylic acid groups (which may be neutralized); while examples of suitable polar atoms include halogens such as chlorine. The ethylene polymer containing these polar groups may be formed by chemical treatment, e.g., chlorination, of polyethylene or it may be made by copolymerization of ethylene with one or more polar group containing comonomers. Examples of such comonomers include unsaturated carboxylic acids, e.g., acrylic or methacrylic acids, or their alkyl esters, e.g., alkyl acrylates or methacrylates, in particular methyl acrylate, methyl methacrylate, ethyl acrylate, and ethyl methacrylate; vinyl esters of carboxylic acids, e.g., vinyl acetate; and vinyl halides, such as vinyl chloride.

Another example of a polar group-containing ethylene polymer is an ionomer such as is commercially available as "Surlyn A". Essentially, the ionomer consists of an olefin copolymer with pendant carboxylic acid groups, partially or completely neutralized with cations such as $NH_4^+$, $Na^+$, $Zn^{++}$, $Mg^{++}$. Copolymers with pendant carboxylic acid groups include copolymers of ethylene, and optionally vinylacetate, with acrylic or methacrylic acid.

The preferred polar group-containing ethylene polymer is an ethylene/vinyl acetate copolymer.

Where the polar group-containing ethylene polymer is an ethylene copolymer, the amount of comonomer units therein preferably comprises between about 1 and 60%, particularly from about 4 to 10%, by weight of the copolymer. The ethylene copolymers preferably have a density in the range of from about 0.910 to 0.950 g/cm$^3$.

The amount of the polar group-containing ethylene polymer employed in the mixture is such that the mixture contains from about 0.025 to 1%, preferably from about 0.1 to 0.7%, by weight of polar groups. The amount of the polar group-containing ethylene polymer employed will thus depend on the proportion of polar groups in the polar group-containing ethylene polymer. However, it is preferred to use from about 0.1 to 15%, preferably from about 2.5 to 7.5%, by weight of the polar group-containing ethylene polymer.

The content of polar groups is determined, for example, by infrared spectrophotometric analysis. In order to determine, e.g., the ester content, the degree of the absorption of a C=O bond is measured, and then an ester content calibrating diagram which has previously been prepared is utilized to determine, for example, a methyl methacrylate, an ethyl acrylate or a vinyl acetate content of the copolymer. Alternatively, it is also possible to determine the concentration of the ester groups by saponification of the polymer with, e.g., an alcoholic potassium base and subsequent titration.

The mixture may contain, in addition to the low density polyethylene and the polar group-containing ethylene polymer, a crystalline olefin polymer, such as high density (density above 0.94 g/cm$^3$) polyethylene and crystalline polypropylene. The amount of such crystalline polymer, if used, is preferably between about 1 and 10% by weight of the mixture, as larger amounts tend to produce open cell foams.

In order to make the film opaque, it is recommended to incorporate from about 1 to 40% by weight of a filler substance having a high masking ability. Preferably the film contains from about 2 to 20% by weight of a whitening filler, like titanium dioxide, zinc sulphide and/or chalk.

According to the present invention there is also provided a process for manufacturing a closed cell foamed film from a polymer mixture containing low density polyethylene and at least one ethylene polymer containing polar groups, and optionally, a crystalline olefin polymer, in which the mixture contains from about 0.025 to 1% by weight of said polar groups, comprising the steps of plastifying the polymer mixture, injecting a blowing agent into the plastified polymer mixture to form a homogeneous mixture, and thereafter extruding the homogeneous mixture.

The blowing agent is preferably a liquid or a gas, or a mixture thereof, having a boiling point at least about 10° C. below the temperature at which the mixture is extruded. Examples of suitable blowing agents are pentane, hexane, heptane, octane, methylpentane, dimethylhexene, petroleum ether fractions and halogenated hydrocarbons such as tetrachloromethane, chloroform, ethylene dichloride, methylene chloride and 1,1,2-trichloro-1,2,2,-trifluoroethane. The preferred blowing agents are pentane, 1,1,2-trichloro-1,2,2-trifluoroethane, difluorodichloromethane, monofluoro-trichloromethane, hexane, petroleum ether (boiling points 40°–60° C. or 60°–80° C.) and methylene chloride, or mixtures thereof.

The amount of blowing agent used is from about 1 to 20% by weight of the mixture. The bulk density of the foamed film is preferably from about 30 to 400, particularly from about 100 to 250, kg/m$^3$, as measured according to DIN 53 420. To make films having a density of from 100 to 250, and particularly from 150 to 225 kg/m$^3$, the concentration of blowing agent is preferably about 10–15% by weight. If the concentration of the blowing agent is above 20% by weight, a closed cell structure is no longer obtained and the product has a poor surface structure.

Nucleating agents known per se, such as mixtures of citric acid and sodium bicarbonate, or talc, silica, calcium silicate or calcium carbonate, are added to the polymer mixture prior to plastification.

The polymer mixture is preferably plastified in an extruder in which the blowing agent is injected into the molten polymer to form the homogeneous mixture. The homogeneous mixture is then extruded, generally at an extrusion pressure of from about 40 to 100 bar, through a slot die, or more preferably, through an annular die. The extrusion temperature is generally in the range of from about 90° to 170° C., preferably from about 100° to 120° C., and in particular from about 105° to 115° C.

It has been found that the best foam structure is obtained when the distance from the extruder to the atmosphere is as short as possible. Therefore, a short die land should be used.

Where an annular die is employed, the extruded tube is inflated, then collapsed, cut to a flat film and and rolled up. The thickness of the foamed film is preferably from about 0.2 to 1 mm, and particularly from about 0.3 to 0.6 mm. The closed cells of the foamed film preferably have an average cell diameter of from about 0.05 to 1 mm, and particularly from about 0.3 to 0.8 mm.

In comparison with open celled foamed films made from mixtures of high and low density polyethylene, foamed films made in accordance with the invention have a finer cell structure and a smoother surface. This gives the film better printing characteristics, enabling fine detail to be consistently printed. The films are also durable, i.e., abrasion resistant, dimensionally stable, lightweight yet sufficiently strong to permit application to walls and ceilings without tearing and, while being strong, permit a small degree of stretching to conform to imperfections, e.g., bulges, in the wall. On the other hand, the films may be of sufficient bulk to hide minor imperfections, e.g., cracks, in the wall. Because the film does not swell when wetted, it may be applied to a wall using an aqueous wall covering adhesive, either by pasting the wall or by pasting the film.

A further advantage of the films of the present invention is that a smaller amount of blowing agent is required to make a film of low bulk density in comparison with the open cell foams made from mixtures of low density and high density polyethylene.

In order to obtain good adhesion of a printed pattern to the film, the surface of the latter which is to be printed may be subjected to a suitable physical or chemical surface treatment. Corona discharge treatment is particularly suitable. A suitable description of corona discharge treatment occurs in "Plastics and Polymers", April 1969. When the film is discharge treated, its surface tension is increased. Desirably the surface tension on the surface to be printed is above about 35 mN/m, and is particularly between about 40 and 55 mN/m, measured according to the following wetting test method.

In this test method, mixtures of formamide and ethylene glycol monoethyl ether are used which have particular surface tensions, depending on the quantitative composition of these mixtures. A liquid film applied to the foamed film by brushing must not form drops within less than 2 seconds. If the liquid film remains coherent for more than 2 seconds, the mixture of the next higher surface tension is applied, and if the liquid film forms drops within less than 2 seconds, the test is repeated using the mixture of the next lower surface tension. When the liquid film remains coherent for exactly 2 seconds, the surface tension of the mixture corresponds to the surface tension of the foamed film.

One requirement of the film is that it can be fastened to a wall by means of a conventional wall covering adhesive, and the adhesion of the film to the wall with said adhesive must be adequate to keep the film in place. On the other hand it is desirable that the adhesion is not too great, so that the film can readily be stripped from the wall when desired. For this reason the surface tension of the reverse surface, i.e., that surface of the film which is to be fastened to the wall, may be less than that of the face surface and is preferably between about 30 and 40 mN/m, and particularly from about 32 to 35 mN/m.

While discharge treatment of the face surface of the film to improve print adhesion may also give rise to some increase in the adhesion of the reverse surface, it may also be desirable to discharge treat the reverse surface, but to a lesser degree than the treatment given to the face surface. The discharge treatment may be carried out in-line with extrusion, e.g., after forming the flat film but prior to rolling it up.

When intended for use as a wall covering, the film may be provided on its surface with a printed pattern. Such a pattern may be applied by any of the conventional printing techniques, for example, surface printing, flexographic printing, gravure printing, screen printing, intaglio printing, jet printing, and transfer printing. Suitable printing inks include polyamide inks. Prior to printing it may be desirable to apply an overall coating with a white or colored ink to improve the opacity and reduce the sheen or gloss of the film.

The film may also be embossed, either prior to, simultaneously with, or subsequent to printing or coating. To effect embossing, the film may be passed between a nip formed by a metal roller bearing a raised embossing pattern thereon and a backing roll having a corresponding female embossing pattern. The female embossed roller is conveniently made of paper into which the female embossing pattern has been impressed by running the paper roller against the metal rollers. Alternatively the female roller may be of metal bearing the female embossing pattern engraved therein. While the film may be heated prior to embossing and embossed with a cold emboss roller, such heating weakens the film and stretching may result. This may give rise to problems of accurate registration with a printed pattern applied either prior to or subsequent to embossing. It is therefore preferred to emboss the film using a heated roller with little or no preheating of the film.

Alternatively an embossed pattern may be applied to the film by passing the film between an embossing roller and a plain, non resilient roller. In this case the film will have one surface embossed, with consequent compression of the foam structure, while the other surface is flat or unembossed. In such a process the film or the embossing roller, preferably the latter, may be heated.

Another method of obtaining a relief texture is to print onto the film a foamable composition which is then caused to foam. It will be appreciated that such a foamable composition should foam at a relatively low temperature so that forming can be effected without heating the film to such a temperature that the foam polyethylene structure is destroyed.

Where an embossed texture is applied to the film, the latter may be of use as a wall covering, i.e., as a so-called "white" without the need for the application of a printed pattern. However, even in that case it is desirable to apply an overall coating to the film, prior to embossing, to increase opacity and reduce the sheen of the film.

The foamed film may alternatively be used as a lining paper, in which case no embossing or printing may be applied. It is still advantageous, when using the foamed film as a lining paper, to discharge treat the film; however, when used as a lining paper the surface that has been discharge treated to the greater extent is preferably fastened to the wall. In this way another wall covering may be hung over the lining paper, and the difference in adhesion between the wall covering and lining paper on the one hand, and between the lining paper and the wall on the other hand, enables the wall covering to be stripped readily from the lining paper, leaving the latter securely fastened to the wall. If desired the film may be laminated, for example to paper, to textile webs or to plastics foils, e.g., metallized polyester, by means of suitable adhesives, in order to obtain a variety of decorative effects.

Likewise an adhesive material may be applied to the reverse face of the film for hanging the film on a wall. Such an adhesive may be a water activatable adhesive material, such as a starch adhesive, or it may be a contact adhesive. In the latter case it is preferred that means are provided to enable the film to be slid over the wall surface to the correct position before the contact adhesive comes into contact with the wall. Such means include the provision of a net like material laminated to the film, for example, as described in British Patent Specification No. 1,398,401, or the application of resilient particles to the adhesive layer as described in U.S. Pat. No. 3,592,722 or British Patent Specification No. 1,493,407.

The invention will be illustrated in more detail by the following examples; which are merely illustrative and are not intended to restrict the scope of the invention.

The melt flow index of the polymers is measured according to ASTM-D 1238.

EXAMPLE 1

A foamed film of 550 mm width is prepared in accordance with the invention from a mixture of 83% by weight of a low density ethylene homopolymer having a density of 0.921 g/cm$^3$ and a melt flow index of 0.6 g/10 min., 7% by weight of an ethylene/vinylacetate copolymer containing 5.5% by weight of the acetate group and having a density of 0.926 g/cm$^3$ and a melt flow index of 1.4 g/10 min., and 10% by weight of titanium dioxide.

To this polymer mixture, a stoichiometric mixture of citric acid and sodium bicarbonate is added. After having homogenized the polymer mixture in a tumbling mixer, it is heated in an extruder and melted. A mixture of 1,1,2-trichloro-1,2,2-trifluoroethane and monofluoro-trichloromethane is added as blowing agent in an amount of 15% by weight of the polymer mixture. The polymer mixture is extruded through an annular die, having a diameter of 180 mm and an opening of 0.35 mm, at an extrusion temperature of 111° C. and a pressure of 45 bar. The extruded tube obtained has a diameter of 450 mm. The tube is then collapsed and cut to a flat film; the flattened film is withdrawn, submitted to a corona discharge treatment and rolled up.

For the corona discharge treatment, the film is conveyed in line with the extruder over a rubber coated metal roll. At a distance of 1.5 mm from the surface of the roll an electrode system is arranged to which a high frequency potential of about 10,000 volts is applied.

The film has a density of 210 kg/m$^3$ and a weight per unit area of 83 g/m$^2$. The average thickness of the film is 0.38 mm. The film has about 270 cells per square centimeter of the film surface, and the average greatest dimension of the cells is about 0.7 mm.

The tear strength (as measured by ASTM-D 689-44) of the film in the machine direction is 680 mN. When tested in the transverse direction, the film tears along a line at right angles to the initiating cut, and so a valid transverse direction tear strength value cannot be quoted.

The elongation of the film under load is measured by clamping the ends of a sample of length 250 mm and 60 mm width between a fixed and a movable clamp. The unclamped length of the sample is 127 mm. Loads are applied to the sample and the elongation measured. Hence, the load at 5% elongation is computed and found to be 0.96 MN/m$^2$.

After the corona discharge treatment, the surface tension of the face surface of the film is 48–52 mN/m while that of the reverse surface is 32–34 mN/m (wetting test method).

The water vapor permeability (as measured by DIN 53122) is 3.5 g/m$^2$ d.

A sample of the film is maintained for 4 days at 50° C., and the change in dimensions noted. The length is decreased by 1%, while the width is increased by 1%.

An overall coating of a white pigmented polyamide-based ink is then applied to the face surface of the film by gravure printing. The dry weight of the coating is about 5 g/m$^2$. A three color floral pattern is then gravure printed on the coated film using polyamide-based inks at a line speed of 2.5 m/s. The wall covering is then trimmed to a width of 523 mm.

The scrubbability of the printing is then assessed according to draft British Standard 1248, wherein an abrasive powder wetted with a soap solution is applied to a sample of the wall covering and the thus treated sample is scrubbed with a reciprocating nylon bristle brush weighted to give an applied load of 600 g. 38 return strokes or scrubs are required before the printed pattern shows any sign of damage.

The printed trimmed wall covering is hung on an emulsion painted plaster wall using "Polycell Heavy Duty" wall covering hanging adhesive, which is applied to the wall rather than to the film. The film is easily hung with no apparent defects.

After 1 week, the wall covering could be stripped cleanly from the wall, requiring a perpendicular stripping force of about 60 g per cm width of wall covering.

EXAMPLE 2a

A mixture of 88% by weight of a low density ethylene homopolymer having a density of 0.923 g/cm$^3$ and a melt flow index of 0.6 g/10 min., 2% by weight of an ethylene/vinylacetate copolymer containing 5.5% by weight of the acetate group, having a density of 0.926 g/cm$^3$ and a melt flow index of 1.4 g/10 min, 10% by weight of titanium dioxide and a stoichiometric mixture of citric acid and sodium bicarbonate is homogenized, heated and melted. 1,1,2-trichloro-1,2,2-trifluoroethane is added as a blowing agent in an amount of 16% by weight of the polymer mixture. The polymer mixture is extruded as described in Example 1. The extrusion temperature is 115° C., and the pressure is 62 bar. The extruded tube obtained has a wall thickness of 0.37 mm and a weight per unit area of 96 g/m$^2$. Although the film of Example 2a has, in comparison with the film made in Example 3, a smoother surface, the printing properties of the film are not yet sufficient.

EXAMPLE 2b

A closed cell foamed film is manufactured from a mixture of 85% by weight of the low density ethylene homopolymer of Example 2a, 5% by weight of the ethylene copolymer of Example 2a, and 10% by weight of titanium dioxide as described in Example 2a. The film has a finer cell structure and a smoother surface than that of Example 2a.

EXAMPLE 2c

A closed cell foamed film is manufactured from a mixture of 80% by weight of the low density ethylene homopolymer of Example 2a, 5% by weight of the ethylene copolymer of Example 2a, 5% by weight of "Surlyn A", containing 7.4% by weight of polar groups and having a density of 0.94 g/cm$^3$ and a melt flow index of 3.6 g/10 min., and 10% by weight of titanium dioxide, as described in Example 2a. The extrusion temperature is 111° C. and the pressure 54 bar. The extruded tube obtained has a wall thickness of 0.28 mm and a weight per unit area of 100 g/m$^2$. The film has a fine cell structure, a smooth surface and good printing characteristics.

EXAMPLE 3

For comparison, a closed cell foamed film is made in accordance with the prior art from a mixture of 90% by weight of the low density ethylene homopolymer of Example 2a and 10% by weight of titanium dioxide.

To this homogenized mixture, a stoichiometric mixture of citric acid and sodium bicarbonate is added. After melting this mixture, a mixture of trichloromonofluoromethane and dichlorodifluoromethane is added as a blowing agent in an amount of 10% by weight of the molten mixture. The molten mixture is extruded as described in Example 1. The extrusion temperature is 115° C., and the pressure is 62 bar. The extruded tube obtained has a wall thickness of 0.35 mm and a weight per unit area of 100 g/m$^2$. The melt strength of the mixture is too low.

The characteristic features of the films manufactured according to Examples 2a, 2b, 2c and 3 are listed in the following Table.

TABLE

| | Dimension | Measuring Method | 2a | 2b | 2c | 3 |
|---|---|---|---|---|---|---|
| Thickness | mm | | 0.37 | 0.34 | 0.28 | 0.35 |
| weight per unit area | g/m$^2$ | | 96 | 86 | 100 | 100 |
| density | kg/m$^3$ | DIN 53420 | 259 | 252 | 357 | 286 |
| number of cells | /cm$^2$ | | 215 | 240 | 280 | 125 |
| water vapor permeability | g/m$^2$d | DIN 53122 | 3.1 | 3.3 | 3.7 | 3.5 |
| elongation at break | | | | | | |
| long. | % | DIN 53455 | 57 | 74 | 84 | 45 |
| transv. | % | " | 49 | 55 | 65 | 41 |
| tensile strength | | | | | | |
| long. | MN/m$^2$ | DIN 53455 | 3.6 | 3.6 | 4.0 | 3.7 |
| transv. | MN/m$^2$ | " | 1.7 | 1.8 | 1.9 | 1.8 |
| modulus of elasticity | | | | | | |
| long. | MN/m$^2$ | DIN 53455 | 39 | 41 | 41 | 42 |
| transv. | MN/m$^2$ | " | 25 | 26 | 26 | 28 |
| tear strength | | | | | | |
| long. | mN | ASTMD 689-44 | 610 | 630 | 800 | 580 |
| transv. | mN | " | | not measurable | | 1710 |

What is claimed is:

1. A wall or ceiling covering, comprising a layer having a thickness of from about 0.2 to 1 mm of a closed cell foamed thermoplastic synthetic resin, said layer having a low bulk density between about 30 and 400 kg/m$^3$, a uniform, smooth and abrasion resistant surface which is readily printable and fine cell structure having an average cell diameter of between about 0.05 and 1 mm, said thermoplastic synthetic resin consisting essentially of a mixture of a low density polyethylene and a copolymer of ethylene and a comonomer containing polar groups, said comonomer being selected from the group consisting of an unsaturated carboxylic acid, a lower alkyl ester of an unsaturated carboxylic acid, a vinyl ester of a carboxylic acid and a vinyl halide, said mixture containing from about 0.1 to 0.7 percent by weight of said polar grops; and an amount between about 1 and 40 percent by weight of a filler sufficient to render the wall or ceiling covering opaque.

2. A wall or ceiling covering according to claim 1, wherein the mixture contains from about 0.1 to 15 percent by weight of said ethylene copolymer containing polar groups.

3. A wall or ceiling covering according to claim 1, wherein said ethylene copolymer containing polar groups has a density in the range of from about 0.910 to 0.950 g/cm$^3$.

4. A wall or ceiling covering according to claim 1, wherein said ethylene copolymer comprises an ethylene/vinyl acetate copolymer.

5. A wall or ceiling covering according to claim 4, wherein said ethylene/vinyl acetate copolymer contains 5.5 percent by weight acetate groups.

6. A wall or ceiling covering according to claim 2, wherein the mixture contains from about 2.5 to 7.5 percent by weight of said ethylene copolymer containing polar groups.

7. A wall or ceiling covering according to claim 1, wherein said ethylene copolymer contains from about 1 to 60 percent by weight of said polar group containing comonomer units.

8. A wall or ceiling covering according to claim 1, in which the low density polyethylene comprises an ethylene homopolymer.

9. A wall or ceiling covering according to claim 1, in which at least one surface of the product has been subjected to a treatment improving the bonding properties of the surface.

10. A wall or ceiling covering according to claim 1, wherein the surface of the layer is embossed.

11. A wall or ceiling covering according to claim 1, wherein one surface of the layer bears an adhesive.

12. A wall or ceiling covering according to claim 11, further comprising a printed pattern applied to one surface of the layer.

13. A wall or ceiling covering according to claim 1, wherein said mixture further contains up to about 10 percent by weight of a crystalline high density polyethylene polymer.

14. A wall or ceiling covering according to claim 1, wherein one surface of said layer has a surface tension between about 30 and 40 mN/m.

15. A wall or ceiling covering according to claim 14, wherein one surface of said layer has a surface tension between about 32 and 35 mN/m.

16. A wall or ceiling covering according to claim 1, wherein the average cell size is between about 0.3 and 0.8 mm.

17. A wall or ceiling covering according to claim 1, wherein the bulk density is between about 100 and 250 kg/m$^3$.

18. A wall or ceiling covering according to claim 1, said layer having been produced by a process comprising the steps of heat plastifying the polymer mixture, incorporating into the plastified mixture from about 1 to 20 percent by weight of a physical blowing agent selected from the group consisting of a volatile liquid or a gas to form a homogeneous mixture and thereafter extruding the homogeneous mixture at a temperature between about 100° C. and 120° C.

19. A wall or ceiling covering according to claim 18, wherein the amount of blowing agent is between about 10 and 15 percent by weight and said layer has a bulk density between about 100 and 250 kg/m$^3$.

20. A wall or ceiling covering according to claim 18, wherein the blowing agent is selected from pentane, 1,1,2-trichloro-1,2,2-trifluoroethane, difluorodichloromethane, monofluoro-trichloromethane, hexane, petroleum ether (boiling points 40°-60° C. or 60°-80° C.) or methylene chloride.

21. A wall or ceiling covering according to claim 1, wherein said filler comprises between about 2 and 20% by weight of a whitening filler selected from titanium dioxide, zinc sulfide or chalk.

22. A wall or ceiling covering, comprising a layer having a thickness of from about 0.2 to 1 mm of a closed cell foamed thermoplastic synthetic resin, said layer having a low bulk density between about 30 and 400 kg/m, a uniform, smooth and abrasion resistant surface which is readily printable and fine cell structure having an average cell diameter of between about 0.05 and 1 mm, said thermoplastic synthetic resin consisting essentially of a mixture of a low density polyethylene and a copolymer of ethylene and vinyl acetate, said mixture containing from about 0.1 to 0.7 percent by weight of the acetate ester groups; and an amount between about 2 and 20% by weight of a whitening filler.

* * * * *

UNITED STATES PATENT OFFICE
CERTIFICATE OF CORRECTION

Patent No. 4,251,584      Dated February 17, 1981

Inventor(s) Gerardus van ENGELEN, Tom van UTTEREN, Hubertus VONKEN

It is certified that error appears in the above-identified patent and that said Letters Patent are hereby corrected as shown below:

IN THE CLAIMS

In Column 1, line 26, kindly delete "in" and insert instead -- is --.

In Column 9, line 39, kindly delete "grops" and insert instead -- groups --.

In Column 11, line 9, kindly delete "kg/m" and insert instead -- $kg/m^3$ --.

Signed and Sealed this

Thirtieth Day of June 1981

[SEAL]

Attest:

RENE D. TEGTMEYER

Attesting Officer      Acting Commissioner of Patents and Trademarks